United States Patent
Ishikawa et al.

(10) Patent No.: US 9,573,582 B2
(45) Date of Patent: Feb. 21, 2017

(54) CONTROL DEVICE FOR VEHICULAR CONTINUOUSLY VARIABLE TRANSMISSION

(75) Inventors: Shuhei Ishikawa, Toyota (JP); Motonori Kimura, Toyota (JP); Atsushi Ayabe, Toyota (JP); Shinya Toyoda, Nisshin (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 284 days.

(21) Appl. No.: 14/354,434

(22) PCT Filed: Oct. 28, 2011

(86) PCT No.: PCT/JP2011/074980
§ 371 (c)(1),
(2), (4) Date: Aug. 1, 2014

(87) PCT Pub. No.: WO2013/061465
PCT Pub. Date: May 2, 2013

(65) Prior Publication Data
US 2014/0357448 A1 Dec. 4, 2014

(51) Int. Cl.
*B60W 10/101* (2012.01)
*F16H 61/662* (2006.01)
(Continued)

(52) U.S. Cl.
CPC ............ *B60W 10/101* (2013.01); *B60W 10/02* (2013.01); *F16H 61/66259* (2013.01);
(Continued)

(58) Field of Classification Search
None
See application file for complete search history.

(56) References Cited

U.S. PATENT DOCUMENTS

| 4,836,054 A | 6/1989 | Kumura |
| 2010/0248886 A1 | 9/2010 | Jozaki et al. |
| 2014/0019021 A1* | 1/2014 | Yanagida ............ B60W 10/02 701/54 |

FOREIGN PATENT DOCUMENTS

| CN | 101846177 A | 9/2010 |
| JP | 61290269 A | 12/1986 |

(Continued)

OTHER PUBLICATIONS

Machine Translation of JP 2003-226166.
(Continued)

*Primary Examiner* — Ramya Burgess
*Assistant Examiner* — Timothy M Hannon
(74) *Attorney, Agent, or Firm* — Sughrue Mion, PLLC

(57) ABSTRACT

A control device of a continuously variable transmission for a vehicle to which power of a drive force source is input through a transmission path connecting/disconnecting device changes a gear ratio of the continuously variable transmission to a lower vehicle speed side during vehicle deceleration when the transmission path connecting/disconnecting device is in a power transmission interrupted state of interrupting power transmission through a power transmission path between the drive force source and the continuously variable transmission, earlier as compared to when the transmission path connecting/disconnecting device is in a power transmittable state enabling the power transmission, and the control device changes a gear ratio of the continuously variable transmission earlier to the lower vehicle speed side when vehicle deceleration is larger, when the transmission path connecting/disconnecting device is in the power transmission interrupted state.

7 Claims, 7 Drawing Sheets

(51) Int. Cl.
  *B60W 10/02* (2006.01)
  *F16H 61/66* (2006.01)
(52) U.S. Cl.
  CPC .............. *B60W 2510/0208* (2013.01); *B60W 2520/105* (2013.01); *B60W 2710/1005* (2013.01); *B60Y 2300/18083* (2013.01); *F16H 2061/6605* (2013.01); *Y10T 477/6203* (2015.01)

(56) References Cited

FOREIGN PATENT DOCUMENTS

| | | |
|---|---|---|
| JP | 62-53248 A | 3/1987 |
| JP | 62-122834 A | 6/1987 |
| JP | 2003-226166 A | 8/2003 |
| JP | 2005-163906 A | 6/2005 |
| JP | 2005172010 A | 6/2005 |
| JP | 2008106896 A | 5/2008 |
| JP | 2009-92208 A | 4/2009 |

OTHER PUBLICATIONS

Machine Translation of JP 2005-163906.
Machine Translation of JP 2009-092208.
International Search Report of PCT/JP2011/074980, dated Jan. 10, 2012.

* cited by examiner

CONTROL DEVICE FOR VEHICULAR CONTINUOUSLY VARIABLE TRANSMISSION

TECHNICAL FIELD

The present invention relates to a control device of a continuously variable transmission for a vehicle to which power of a drive force source is input via a transmission path connecting/disconnecting device.

BACKGROUND ART

A continuously variable transmission such as a belt-type continuously variable transmission and a toroidal-type continuously variable transmission is well known. For example, this corresponds to continuously variable transmissions described in Patent Documents 1 and 2. Such a continuously variable transmission uses, for example, a rotation speed on an input side of the continuously variable transmission (transmission input rotation speed), a gear ratio of the continuously variable transmission based on the transmission input rotation speed and a rotation speed on an output side of the continuously variable transmission (transmission output rotation speed) and the like to provide shift control of the continuously variable transmission through feedforward control (FF control) and feedback control (FB control). For example, to achieve reduction in cost, it is proposed to remove a rotation speed sensor for detecting a rotation speed. Patent Document 1 discloses a vehicle having a configuration in which an input rotation speed sensor detecting the transmission input rotation speed is removed. If a vehicle does not include the input rotation speed sensor in this way, it is contemplated to use as the transmission input rotation speed a detection value of a rotation speed sensor for detecting a rotation speed of a turbine shaft of a torque converter (or an output shaft of a drive force source) mechanically coupled to an input shaft of the continuously variable transmission.

PRIOR ART DOCUMENTS

Patent Documents

Patent Document 1: Japanese Laid-Open Patent Publication No. 2005-163906
Patent Document 2: Japanese Laid-Open Patent Publication No. 2003-226166

SUMMARY OF THE INVENTION

Problem to be Solved by the Invention

When power of a drive force source such as an engine is input to the continuously variable transmission via a transmission path connecting/disconnecting device such as a known forward/reverse switching device and an input clutch (i.e., if the continuously variable transmission is coupled via the transmission path connecting/disconnecting device to an engine or a torque converter), for example, if a known shift position selection device (shift lever) is set to a neutral "N" position, the transmission path connecting/disconnecting device decouples an input shaft of the continuously variable transmission and a turbine shaft (i.e., power transmission is interrupted between the continuously variable transmission and the torque converter). Therefore, if a shift to "N" is made during running, the transmission input rotation speed becomes unable to be detected and the shift control of the continuously variable transmission cannot be provided through the FB control, resulting in the shift control of the continuously variable transmission provided only through the FF control. Therefore, although control must be provided for returning a gear ratio of the continuously variable transmission to a gear ratio on the lowest vehicle speed side (Lowest, a maximum gear ratio γmax) during vehicle deceleration running in preparation for the next vehicle start, if the shift control of the continuously variable transmission cannot be provided through the FB control because of the shift to "N" during vehicle deceleration running, the gear ratio of the continuously variable transmission may not completely be returned to the Lowest before a vehicle stop. As a result, since the gear ratio of the continuously variable transmission is not completely returned to the Lowest at the time of the vehicle stop, vehicle starting performance may deteriorate. Such a problem is unknown and no proposal has hitherto been made on properly changing a gear ratio to the lower vehicle speed side during vehicle deceleration even when the shift control of the continuously variable transmission is provided only through the FF control.

The present invention was conceived in view of the situations and it is therefore an object of the present invention to provide a control device of a continuously variable transmission for a vehicle capable of properly changing a gear ratio to a lower vehicle speed side during vehicle deceleration to properly ensure starting performance at the next vehicle start.

Means for Solving the Problem

To achieve the object, the first aspect of the invention provides (a) a control device of a continuously variable transmission for a vehicle to which power of a drive force source is input through a transmission path connecting/disconnecting device, (b) the control device changing a gear ratio of the continuously variable transmission to a lower vehicle speed side during vehicle deceleration when the transmission path connecting/disconnecting device is in a power transmission interrupted state of interrupting power transmission through a power transmission path between the drive force source and the continuously variable transmission, earlier as compared to when the transmission path connecting/disconnecting device is in a power transmittable state enabling the power transmission.

Effects of the Invention

Consequently, if the shift control of the continuously variable transmission cannot be provided through the FB control during vehicle deceleration running, an effect of individual variation etc. of the continuously variable transmission cannot be canceled by the shift control of the continuously variable transmission only through the FF control and, therefore, the gear ratio of the continuously variable transmission may not completely be returned to the Lowest before a vehicle stop. In this regard, when the transmission path connecting/disconnecting device is in the power transmission interrupted state, the gear ratio is changed earlier to the lower vehicle speed side as compared to when the transmission path connecting/disconnecting device is in the power transmittable state and, therefore, the gear ratio can properly be changed to the lower vehicle speed side during vehicle deceleration regardless of individual variation etc., even in the shift control of the continuously variable transmission only through the FF control.

Thus, the gear ratio of the continuously variable transmission is more easily returned to the Lowest before a vehicle stop, and the starting performance can properly be ensured at the next vehicle stop.

According to the first aspect of the invention, the gear ratio of the continuously variable transmission at the same vehicle speed is changed to a lower vehicle speed side when the transmission path connecting/disconnecting device is in a power transmission interrupted state as compared to when the transmission path connecting/disconnecting device is in a power transmittable state. Therefore, during vehicle deceleration running, when the transmission path connecting/disconnecting device is changed from the power transmission interrupted state to the power transmittable state (for example, when the shift operation of the shift lever from N to D is made), the vehicle deceleration may be increased because the rotation speed of the drive force source is picked up in the process, which the transmission path connecting/disconnecting device is changed from the power transmission interrupted state to the power transmittable state, or an drive force source brake may be increased after the transmission path connecting/disconnecting device is in the power transmittable state thereby deteriorating the drivability. Therefore, properly ensuring the vehicle starting performance may not be satisfied at the same time with improvement in the drivability. The problem described above is also unknown.

In the control device of a continuously variable transmission for a vehicle recited in the first aspect of the invention, when the transmission path connecting/disconnecting device is in the power transmission interrupted state, a gear ratio of the continuously variable transmission is changed earlier to the lower vehicle speed side when vehicle deceleration is larger. Consequently, an increase in the vehicle deceleration can be suppressed when the transmission path connecting/disconnecting device is changed from the power transmission interrupted state to the power transmittable state during vehicle deceleration running. While a vehicle stop is reached earlier when the vehicle deceleration is larger, the gear ratio of the continuously variable transmission is more easily returned to the Lowest before the vehicle stop.

The second aspect of the invention provides the control device of a continuously variable transmission for a vehicle recited in the first aspect of the invention, wherein a control amount for changing the gear ratio of the continuously variable transmission to the lower vehicle speed side is set larger to change a gear ratio of the continuously variable transmission earlier to the lower vehicle speed side. Consequently, the gear ratio can certainly be changed earlier to the lower vehicle speed side when the transmission path connecting/disconnecting device is in the power transmission interrupted state as compared to when the transmission path connecting/disconnecting device is in the power transmittable state. Alternatively, when the transmission path connecting/disconnecting device is in the power transmission interrupted state, the gear ratio can certainly be changed earlier to the lower vehicle speed side if the vehicle deceleration is larger.

The third aspect of the invention provides the control device of a continuously variable transmission for a vehicle recited in the first aspect of the invention, wherein switching timing is made earlier for switching control of directing a gear ratio of the continuously variable transmission to the lower vehicle speed side at a predetermined change speed to control of directing the gear ratio to the lower vehicle speed side at a change speed faster than the predetermined change speed, to change the gear ratio of the continuously variable transmission earlier to the lower vehicle speed side when vehicle deceleration is larger. Consequently, when the transmission path connecting/disconnecting device is in the power transmission interrupted state, the gear ratio can certainly be changed earlier to the lower vehicle speed side if the vehicle deceleration is larger.

The fourth aspect of the invention provides the control device of a continuously variable transmission for a vehicle recited in the second aspect of the invention, wherein the control amount is a change amount of a target gear ratio to be followed by an actual value of a gear ratio of the continuously variable transmission. Consequently, the control amount can easily be made larger.

The fifth aspect of the invention provides the control device of a continuously variable transmission for a vehicle recited in the second aspect of the invention, wherein the continuously variable transmission includes a pair of variable pulleys having an input-side variable pulley and an output-side variable pulley, and a transmission belt wrapped around between the pair of the variable pulleys, and controls each of an input-side thrust force in the input-side variable pulley and an output-side thrust force in the output-side variable pulley to perform a shift, and wherein the control amount is a change amount of a thrust force ratio based on the input-side thrust force and the output-side thrust force or a change amount of an oil pressure command value for acquiring each of the input-side thrust force and the output-side thrust force. Consequently, the control amount for changing the gear ratio of the continuously variable transmission to the lower vehicle speed side can easily be made larger.

The sixth aspect of the invention provides the control device of a continuously variable transmission for a vehicle recited in any one of the first to fifth aspects of the invention, wherein a detection value of a rotation speed on an input side of the transmission path connecting/disconnecting device is used as a rotation speed of an input side of the continuously variable transmission to provide shift control of the continuously variable transmission. Consequently, the input rotation speed sensor for detecting the rotation speed of the input side of the continuously variable transmission can be eliminated to achieve reduction in cost. For the vehicle providing the shift control of the continuously variable transmission with a detection value of the rotation speed on the input side of the transmission path connecting/disconnecting device with the input rotation speed sensor eliminated, the first to sixth aspects of the invention are particularly useful inventions for solving the unknown problem occurring in the vehicle.

MODE FOR CARRYING OUT THE INVENTION

In the present invention, preferably, although the drive force source is preferably employed by using, for example, a gasoline engine or a diesel engine, i.e., an internal combustion engine generating power from combustion of fuel, another prime mover such as an electric motor may be employed solely or in combination with an engine.

Preferably, the continuously variable transmission is made up of, for example, a so-called belt type continuously variable transmission having a transmission belt wrapped around a pair of variable pulleys to continuously vary a gear ratio in a stepless manner, or a so-called toroidal type continuously variable transmission having a pair of cone members rotated around a common shaft center and a plurality of rollers capable of rotating around a rotation center intersecting with the shaft center such that the rollers are interposed and pressed between the pair of the cone members to change an intersection angle between the rotation center of the rollers and the shaft center so as to continuously vary a gear ratio.

Preferably, for oil pressures caused to act on the input-side variable pulley and the output-side variable pulley, a hydraulic control circuit is configured to control the oil pressures independently of each other. Alternatively, for the oil pressure caused to act on the input-side variable pulley, the hydraulic control circuit may be configured to control a flow rate of operation oil to a hydraulic cylinder of the input-side variable pulley so as to consequently generate an oil pressure acting on the input-side variable pulley rather than directly controlling the oil pressure.

An example of the present invention will now be described in detail with reference to the drawings.

Example

Figure 1:
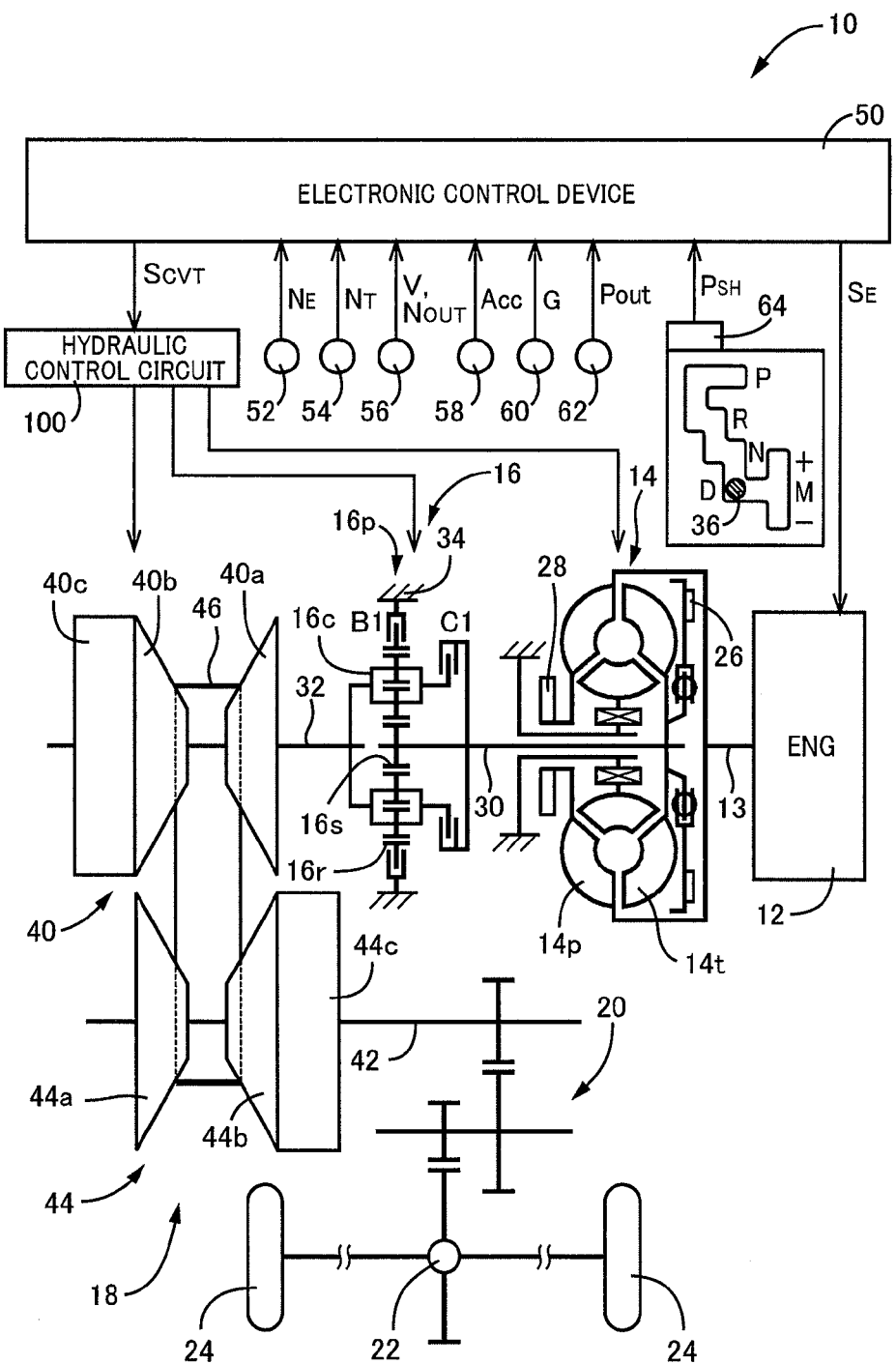
FIG. 1 is a diagram for explaining a general configuration of a vehicle to which the present invention is applied and is a block diagram for explaining a main portion of a control system disposed in the vehicle.

FIG. 1 is a diagram for explaining a general configuration of a vehicle 10 to which the present invention is applied and is a block diagram for explaining a main portion of a control system disposed for controlling portions of the vehicle 10. In FIG. 1, power output from an engine 12 acting as a drive force source for running is transmitted sequentially through a torque converter 14 acting as a fluid transmission device (hydraulic power transmission device), a forward/reverse switching device 16 acting as a transmission path connecting/disconnecting device, a belt type continuously variable transmission (hereinafter referred to as a continuously variable transmission (CVT)) 18 acting as a continuously variable transmission for a vehicle, a reduction gear device 20, a differential gear device 22, etc., to left and right drive wheels 24.

The torque converter 14 includes a pump impeller 14p coupled to a crankshaft 13 of the engine 12 and a turbine impeller 14t coupled to the forward/reverse switching device 16 via a turbine shaft 30 corresponding to an output-side member of the torque converter 14 and transmits power via fluid. A lockup clutch 26 is disposed between the pump impeller 14p and the turbine impeller 14t. The pump impeller 14p is coupled to a mechanical oil pump 28 rotationally driven by the engine 12 to generate an operating oil pressure for providing shift control to the continuously variable transmission 18, to generate a belt clamping pressure in the continuously variable transmission 18, to switch a power transmission path in the forward/reverse switching device 16, and to supply lubricating oil to portions of a power transmission path of the vehicle 10.

The forward/reverse switching device 16 is mainly made up of a forward clutch C1, a reverse brake B1, and a double pinion type planetary gear device 16p. A sun gear 16s of the planetary gear device 16p is integrally coupled to the turbine shaft 30 and a carrier 16c of the planetary gear device 16p is integrally coupled to an input shaft 32 of the continuously variable transmission 18. The carrier 16c and the sun gear 16s are selectively coupled via the forward clutch C1 while a ring gear 16r of the planetary gear device 16p is selectively fixed via the reverse brake B1 to a housing 34 acting as a non-rotating member. The forward clutch C1 and the reverse brake B1 are hydraulic friction engagement devices.

In the forward/reverse switching device 16 configured as above, when the forward clutch C1 is engaged and the reverse brake B1 is released, the forward/reverse switching device 16 is put into an integrally rotating state and the turbine shaft 30 is directly coupled to the input shaft 32 to establish (achieve) a forward power transmission path (i.e., the forward/reverse switching device 16 is put into a power transmittable state enabling power transmission for forward movement). When the reverse brake B1 is engaged and the forward clutch C1 is released, a reverse power transmission path is established (achieved) in the forward/reverse switching device 16 (i.e., the forward/reverse switching device 16 is put into a power transmittable state enabling power transmission for reverse movement) and the input shaft 32 is rotated in a reverse direction relative to the turbine shaft 30. When both the forward clutch C1 and the reverse brake B1 are released, the forward/reverse switching device 16 is put into a neutral state (power transmission interrupted state) in which the power transmission is interrupted.

The continuously variable transmission 18 includes a pair of variable pulleys 40 and 44 having an input-side variable pulley (a primary pulley, a primary sheave) 40 with a variable effective diameter acting as an input-side member disposed on the input shaft 32, and an output-side variable pulley (a secondary pulley, a secondary sheave) 44 with a variable effective diameter acting as an output-side member disposed on an output shaft 42, and a transmission belt 46 wrapped around between the pair of the variable pulleys 40 and 44, and power is transmitted through a frictional force between the pair of the variable pulleys 40, 44 and the transmission belt 46.

The primary pulley 40 includes a fixed rotating body (fixed sheave) 40a as an input-side fixed rotating body fixed to the input shaft 32, a movable rotating body (movable sheave) 40b as an input-side movable rotating body disposed relatively non-rotatably around an axis and movably in an axial direction relative to the input shaft 32, and an input-side hydraulic cylinder (primary-side hydraulic cylinder) 40c as a hydraulic actuator applying an input-side thrust force (primary thrust force) Win (=a primary pressure Pin×a pressure receiving area) in the primary pulley 40 for changing a V-groove width therebetween. The secondary pulley 44 includes a fixed rotating body (fixed sheave) 44a as an output-side fixed rotating body fixed to the output shaft 42, a movable rotating body (movable sheave) 44b as an output-side movable rotating body disposed relatively non-rotatably around an axis and movably in an axial direction relative to the output shaft 42, and an output-side hydraulic cylinder (secondary-side hydraulic cylinder) 44c as a hydraulic actuator applying an output-side thrust force (secondary thrust force) Wout (=a secondary pressure Pout×a pressure receiving area) in the secondary pulley 44 for changing a V-groove width therebetween.

The primary pressure Pin, i.e., an oil pressure to the primary-side hydraulic cylinder 40c, and the secondary pressure Pout, i.e., an oil pressure to the secondary-side hydraulic cylinder 44c, are adjusted and controlled independently of each other by a hydraulic control circuit 100 (see FIG. 2) to respectively directly or indirectly control the primary thrust force Win and the secondary thrust force Wout. As a result, the V-groove widths of the pair of the variable pulleys 40 and 44 are changed to vary wrapping diameters (effective diameters) of the transmission belt 46 so as to continuously vary a gear ratio $\gamma$ (=input shaft rotation speed $N_{IN}$/output shaft rotation speed $N_{OUT}$) while a friction force (belt clamping pressure) between the pair of the variable pulleys 40, 44 and the transmission belt 46 is controlled so as not to cause a slip of the transmission belt 46. Therefore, the primary thrust force Win and the secondary thrust force Wout are respectively controlled to set an actual gear ratio $\gamma$ to a target gear ratio $\gamma^*$ while a slip of the transmission belt 46 is prevented. The input shaft rotation speed $N_{IN}$ is a rotation speed of the input shaft 32 and the output shaft rotation speed $N_{OUT}$ is a rotation speed of the output shaft 42. In the present invention, as can be seen from FIG. 1, the input shaft rotation speed $N_{IN}$ is the same as a rotation speed of the primary pulley 40 and the output shaft rotation speed $N_{OUT}$ is the same as a rotation speed of the secondary pulley 44.

In the continuously variable transmission 18, for example, when the primary pressure Pin is increased, the V-groove width of the primary pulley 40 is narrowed and the gear ratio $\gamma$ is reduced, i.e., the continuously variable transmission 18 is shifted up. When the primary pressure Pin is decreased, the V-groove width of the primary pulley 40 is widened and the gear ratio $\gamma$ is increased, i.e., the continuously variable transmission 18 is shifted down. Therefore, when the V-groove width of the primary pulley 40 is minimized, a minimum gear ratio $\gamma$min (a highest-speed-side gear ratio, the Highest) is formed as a gear ratio $\gamma$ of the continuously variable transmission 18. When the V-groove width of the primary pulley 40 is maximized, a maximum gear ratio $\gamma$max (a lowest-speed-side gear ratio, the Lowest) is formed as the gear ratio $\gamma$ of the continuously variable transmission 18. While a slip of the transmission belt 46 (belt slip) is prevented by the primary pressure Pin (having the same meaning as the primary thrust force Win) and the secondary pressure Pout (having the same meaning as the secondary thrust force Wout), the target gear ratio $\gamma^*$ is achieved in accordance with correlation between the primary thrust force Win and the secondary thrust force Wout, and an intended shift is not achieved by only one pulley pressure (having the same meaning as a thrust force).

The vehicle 10 includes a shift lever 36 disposed near a driver's seat, for example, and acting as a shift position selection device capable of selecting a plurality of types of shift positions $P_{SH}$ through artificial operation. The shift lever 36 is disposed to be manually operated to "P (parking)" that is a parking position (P-position) for achieving a neutral state, i.e., a neutral state in which a power transmission path between the engine 12 and the drive wheels 24 is interrupted while an output rotating member of the continuously variable transmission 18 is locked; "R (reverse)" that is a reverse running position (R-position) for reverse running; "N (neutral)" that is a neutral position (N-position) for achieving the neutral state; "D (drive)" that is a forward automatic running position (D-position) acting as an automatic shift position for establishing an automatic shift mode to provide automatic shift control of the continuously variable transmission 18 in accordance with a shift map (see FIG. 4); or "M (manual)" that is a forward manual running position (M-position) acting as a manual shift position for establishing a manual shift mode to provide manual shift control of switching the gear ratio $\gamma$ of the continuously variable transmission 18 to any of preset gear ratios changed in a stepped manner in accordance with the shift operation of the shift lever 36.

When the shift lever 36 is operated to the P-position or the N-position, both the forward clutch C1 and the reverse brake B1 are released in the forward/reverse switching device 16, and the forward/reverse switching device 16 is put into the power transmission interrupted state of interrupting power transmission through a power transmission path between the torque converter 14 (the engine 12) and the continuously variable transmission 18. When the shift lever 36 is operated to the D-position or the M-position, the forward clutch C1 is engaged while the reverse brake B1 is released, and the forward/reverse switching device 16 is put into the power transmittable state enabling the power transmission for forward movement through the power transmission path. When the shift lever 36 is operated to the R-position, the reverse brake B1 is engaged while the forward clutch C1 is released, and the forward/reverse switching device 16 is put into the power transmittable state enabling the power transmission for reverse movement through the power transmission path.

The vehicle 10 includes an electronic control device 50 including a control device of a continuously variable transmission for a vehicle related to the shift control of the continuously variable transmission 18, for example. The electronic control device 50 includes a so-called microcomputer having a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 50 provides output control of the engine 12, the shift control and belt clamping pressure control of the continuously variable transmission 18, etc., and is configured separately for engine control, hydraulic control of the continuously variable transmission 18, etc., as needed.

The electronic control device 50 is supplied with various input signals (e.g., an engine rotation speed $N_E$, a turbine rotation speed $N_T$, the output shaft rotation speed $N_{OUT}$ that is a rotation speed of the output shaft 42 defined as the output rotation speed of the continuously variable transmission 18 corresponding to a vehicle speed V, an accelerator opening degree $A_{CC}$, vehicle acceleration (having the same meaning as vehicle deceleration) G that is longitudinal acceleration of the vehicle 10, the secondary pressure Pout, and the shift position $P_{SH}$ that is an operation position of the shift lever 36) detected by sensors (e.g., an engine rotation speed sensor 52, a turbine rotation speed sensor 54, an output shaft rotation speed sensor 56, an accelerator opening degree sensor 58, a vehicle acceleration sensor 60, a secondary pressure sensor 62, and a shift position sensor 64) disposed on the vehicle 10. The electronic control device 50 supplies devices (e.g., the engine 12 and the hydraulic control circuit 100) disposed on the vehicle 10 with various output signals (e.g., an engine output control command signal $S_E$ for the output control of the engine 12, and a hydraulic control command signal $S_{CVT}$ for the hydraulic control related to a shift of the continuously variable transmission 18). The hydraulic control command signal $S_{CVT}$ may be, for example, a command signal for driving a linear solenoid valve SLP controlling the primary pressure Pin, a command signal for driving a linear solenoid valve SLS controlling the secondary pressure Pout, and a command signal for driving a linear solenoid valve SLT controlling a line oil pressure $P_L$.

Figure 2:
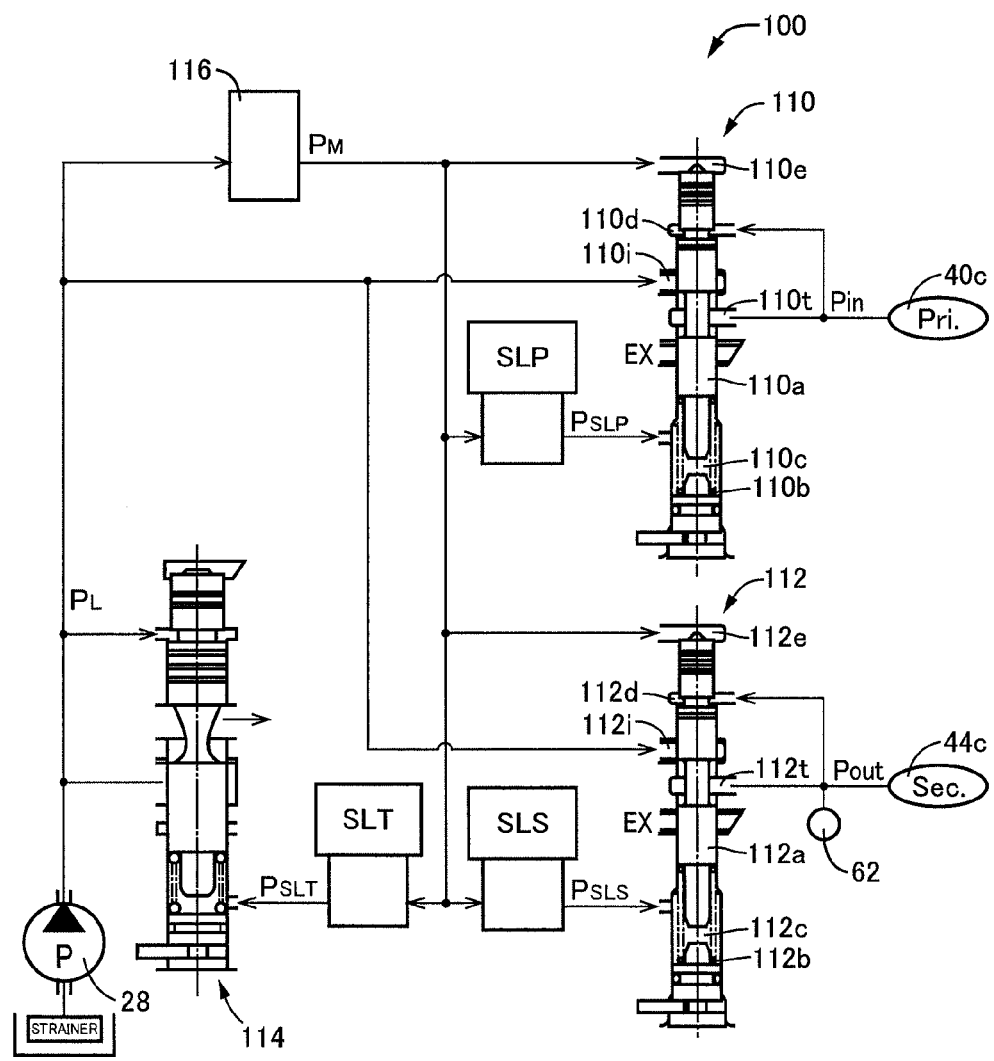
FIG. 2 is a hydraulic circuit diagram of a main portion relevant to shift control etc. of the continuously variable transmission in the hydraulic control circuit.

FIG. 2 is a hydraulic circuit diagram of a main portion relevant to shift control etc. of the continuously variable transmission 18 in the hydraulic control circuit 100. In FIG. 2, the hydraulic control circuit 100 includes, for example, the oil pump 28, a primary pressure control valve 110 adjusting the primary pressure Pin supplied to the primary-side hydraulic cylinder 40c for changing the gear ratio γ of the continuously variable transmission 18, a secondary pressure control valve 112 adjusting the secondary pressure Pout supplied to the secondary-side hydraulic cylinder 44c for preventing a slip of the belt, a primary regulator valve 114 adjusting the line oil pressure $P_L$, a modulator valve 116 adjusting a modulator oil pressure $P_M$, the linear solenoid valve SLP controlling the primary pressure Pin, the linear solenoid valve SLS controlling the secondary pressure Pout, the linear solenoid valve SLT controlling the line oil pressure $P_L$, and the secondary pressure sensor 62 acting as an oil pressure sensor detecting the secondary pressure Pout.

The line oil pressure $P_L$ is adjusted from an original pressure that is an operating oil pressure output from the oil pump 28, by the relief type primary regulator valve 114 to a value corresponding to an engine load etc., based on a control oil pressure $P_{SLT}$ that is an output oil pressure of the linear solenoid valve SLT. For example, the line oil pressure $P_L$ is adjusted based on the control oil pressure $P_{SLT}$ set to acquire an oil pressure obtained by adding a predetermined allowance (margin) to a higher oil pressure between the primary pressure Pin and the secondary pressure Pout. Therefore, the insufficient line oil pressure $P_L$ can be avoided when used as the original pressure in the adjustment operation of the primary pressure control valve 110 and the secondary pressure control valve 112, and the line oil pressure $P_L$ can be prevented from being unnecessarily increased. A modulator oil pressure $P_M$ acts as original pressures of the control oil pressure $P_{SLT}$ controlled by the electronic control device 50, a control oil pressure $P_{SLP}$ that is an output oil pressure of the linear solenoid valve SLP, and a control oil pressure $P_{SLS}$ that is an output oil pressure of the linear solenoid valve SLS, and is adjusted from an original pressure that is the line oil pressure $P_L$ by the modulator valve 116 to a constant pressure.

The primary pressure control valve 110 includes a spool valve piece 110a disposed movably in the axial direction to open/close an input port 110i so that the line oil pressure $P_L$ can be supplied from the input port 110i through an output port 110t to the primary-side hydraulic cylinder 40c, a spring 110b acting as a biasing means biasing the spool valve piece 110a in a valve-opening direction, an oil chamber 110c housing the spring 110b and receiving the control oil pressure $P_{SLP}$ for applying a thrust force in the valve-opening direction to the spool valve piece 110a, a feedback oil chamber 110d receiving the line oil pressure $P_L$ output from the output port 110t for applying a thrust force in a valve-closing direction to the spool valve piece 110a, and an oil chamber 110e receiving the modulator oil pressure $P_M$ for applying a thrust force in the valve-closing direction to the spool valve piece 110a. The primary pressure control valve 110 configured as above uses, for example, the control oil pressure $P_{SLP}$ as a pilot pressure to adjust and control the line oil pressure $P_L$ for supply to the primary-side hydraulic cylinder 40c. As a result, the line oil pressure $P_L$ is supplied as the primary pressure Pin to the primary-side hydraulic cylinder 40c. For example, if the control oil pressure $P_{SLP}$ increases, the spool valve piece 110a moves toward the upper side of FIG. 2 and the primary pressure Pin increases. On the other hand, if the control oil pressure $P_{SLP}$ decreases, the spool valve piece 110a moves toward the lower side of FIG. 2 and the primary pressure Pin decreases.

The secondary pressure control valve 112 includes a spool valve piece 112a disposed movably in the axial direction to open/close an input port 112i so that the line oil pressure $P_L$ can be supplied from the input port 112i through an output port 112t to the secondary-side hydraulic cylinder 44c; a spring 112b acting as a biasing means biasing the spool valve piece 112a in the valve-opening direction; an oil chamber 112c housing the spring 112b and receiving the control oil pressure $P_{SLS}$ for applying a thrust force in the valve-opening direction to the spool valve piece 112a; a feedback oil chamber 112d receiving the line oil pressure $P_L$ output from the output port 112t for applying a thrust force in the valve-closing direction to the spool valve piece 112a; and an oil chamber 112e receiving the modulator oil pressure $P_M$ for applying a thrust force in the valve-closing direction to the spool valve piece 112a. The secondary pressure control valve 112 configured as above uses, for example, the control oil pressure $P_{SLS}$ as a pilot pressure to adjust and control the line oil pressure $P_L$ for supply to the secondary-side hydraulic cylinder 44c. As a result, the line oil pressure $P_L$ is supplied as the secondary pressure Pout to the secondary-side hydraulic cylinder 44c. For example, if the control oil pressure $P_{SLS}$ increases, the spool valve piece 112a moves toward the upper side of FIG. 2 and the secondary pressure Pout increases. On the other hand, if the control oil pressure $P_{SLS}$ decreases, the spool valve piece 112a moves toward the lower side of FIG. 2 and the secondary pressure Pout decreases.

Figure 3:
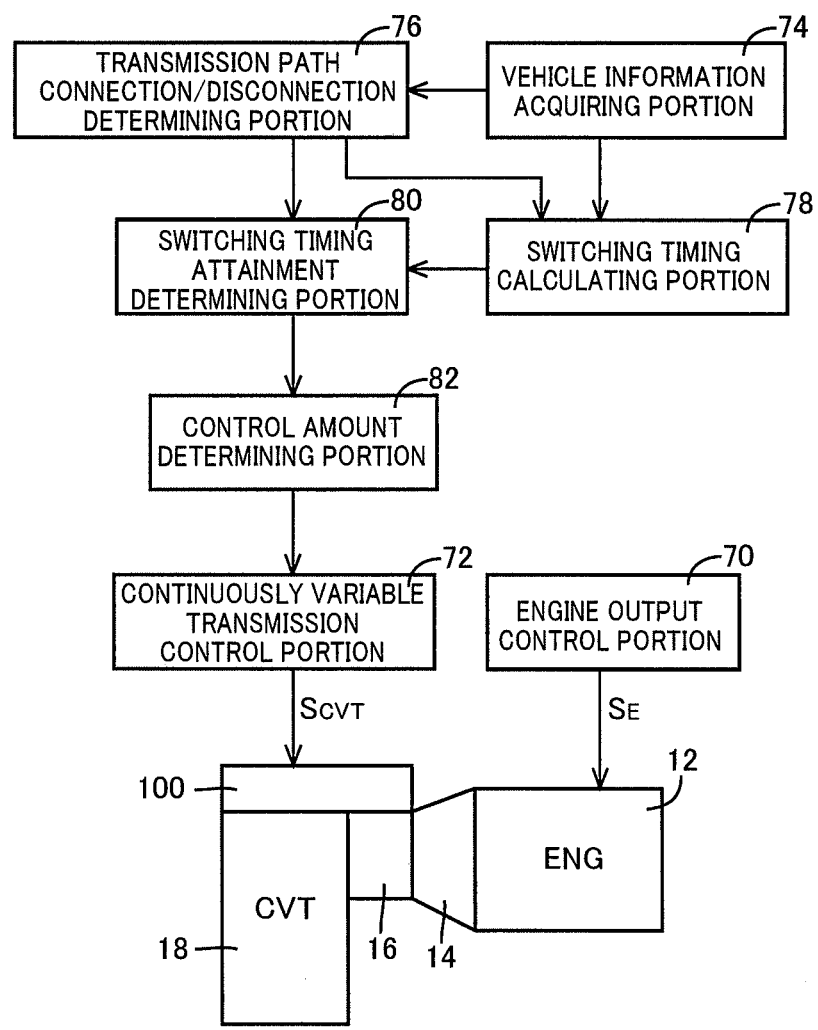
FIG. 3 is a functional block diagram for explaining a main portion of the control function of the electronic control device.

FIG. 3 is a functional block diagram for explaining a main portion of the control function of the electronic control device 50. In FIG. 3, an engine output control means, i.e., an engine output control portion 70 outputs the engine output control command signal $S_E$ such as a throttle signal, an injection signal, and an ignition timing signal to a throttle actuator, a fuel injection device, and an ignition device, respectively, for the output control of the engine 12. For example, the engine output control portion 70 sets a target engine torque $T_E^*$ for acquiring a drive force (drive torque) corresponding to the accelerator opening degree $A_{CC}$, controls the opening/closing of the electronic throttle valve through the throttle actuator so as to acquire the target engine torque $T_E^*$, controls a fuel injection amount through the fuel injection device, and controls an ignition timing through the ignition device.

A continuously variable transmission control means, i.e., a continuously variable transmission control portion 72 determines a primary instruction oil pressure Pintgt as a command value (or target primary pressure Pin*) of the primary pressure Pin and a secondary instruction oil pressure Pouttgt as a command value (or target secondary pressure Pout*) of the secondary pressure Pout such that the target gear ratio γ* of the continuously variable transmission 18 is achieved while a belt slip of the continuously variable transmission 18 is prevented from occurring, for example, and outputs the primary instruction oil pressure Pintgt and the secondary instruction oil pressure Pouttgt as the hydraulic control command signal $S_{CVT}$ to the hydraulic control circuit 100.

Figure 4:
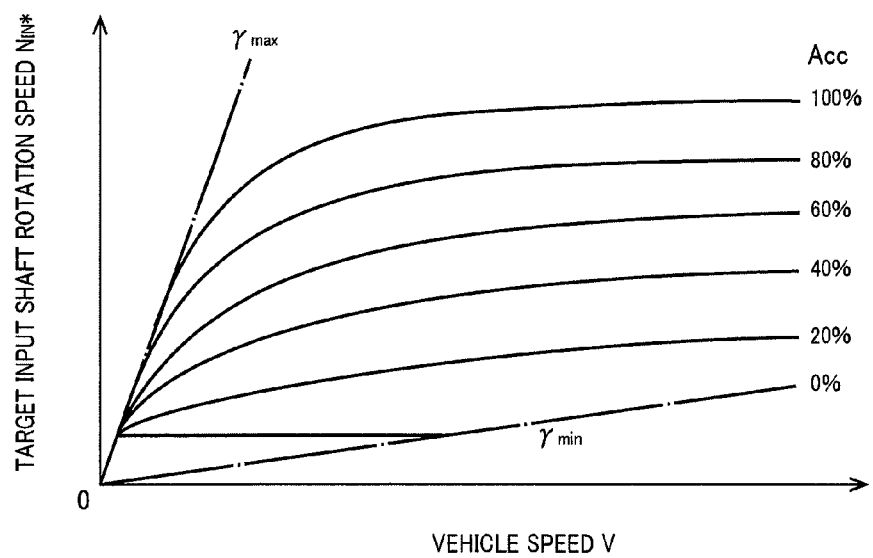
FIG. 4 is a diagram depicting an example of a shift map used when a target input shaft rotation speed is obtained in the shift control of the continuously variable transmission.

Specifically, the continuously variable transmission control portion 72 sets a target input shaft rotation speed $N_{IN}$* based on a vehicle state indicated by an actual vehicle speed V and the accelerator opening degree $A_{CC}$ from a preliminarily obtained and stored relationship (shift map) between the vehicle speed V and the target input shaft rotation speed $N_{IN}$* of the continuously variable transmission 18 by using the accelerator opening degree $A_{CC}$ as a parameter as depicted in FIG. 4, for example. The continuously variable transmission control portion 72 calculates a target gear ratio γ*(=$N_{IN}$*/$N_{OUT}$) based on the target input shaft rotation speed $N_{IN}$*. The shift map of FIG. 4 corresponds to a shift condition for satisfying both drivability (power performance) and fuel consumption property (fuel consumption performance) and has the target input shaft rotation speed $N_{IN}$* set such that a greater gear ratio γ is achieved when the vehicle speed V is smaller and the accelerator opening degree $A_{CC}$ is larger. The target gear ratio γ* (=$N_{IN}$*/$N_{OUT}$) is set within a range between a minimum gear ratio γmin and a maximum gear ratio γmax of the continuously variable transmission 18.

Figure 5:
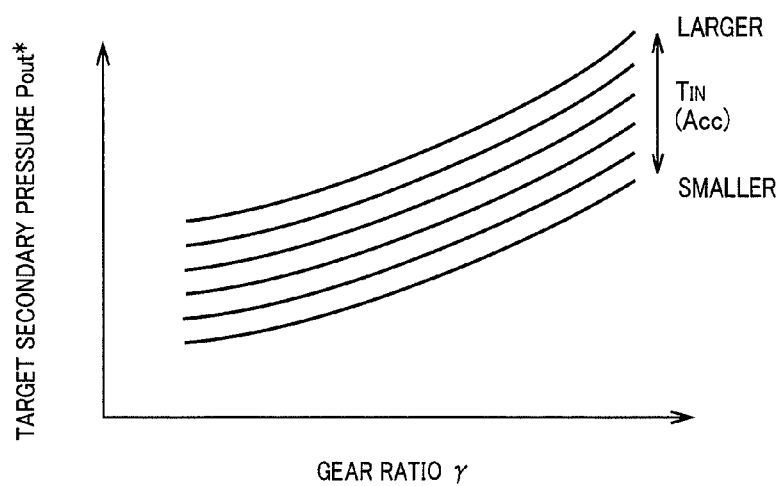
FIG. 5 is a diagram depicting an example of a belt clamping pressure map used when a target secondary pressure is obtained in the shift control of the continuously variable transmission.

The continuously variable transmission control portion 72 sets the target secondary pressure Pout* based on a vehicle state indicated by the actual gear ratio γ and an input torque $T_{IN}$ from a preliminarily obtained and stored relationship (belt clamping pressure map) between the gear ratio γ and the target secondary pressure Pout* corresponding to a belt clamping pressure by using the input torque $T_{IN}$ of the continuously variable transmission 18 (or the accelerator opening degree $A_{CC}$, etc.) as a parameter as depicted in FIG. 5, for example. The belt clamping pressure map of FIG. 5 corresponds to a control condition for causing the pair of the variable pulleys 40 and 44 to generate a belt clamping pressure preventing a belt slip from occurring without an unnecessary increase, for example.

The continuously variable transmission control portion 72 calculates the input torque $T_{IN}$ of the continuously variable transmission 18 as a torque (=$T_E$×t) acquired by multiplying an engine torque $T_E$ by a torque ratio t of the torque converter 14 (=a turbine torque $T_T$/a pump torque $T_P$), for example. The continuously variable transmission control portion 72 calculates an estimated value of the engine torque $T_E$ from, for example, a relationship not depicted (an engine torque map) empirically obtained and stored in advance between the engine rotation speed $N_E$ and the engine torque $T_E$ by using an intake air quantity (or a throttle valve opening degree etc.) as a parameter, based on an actual intake air quantity and the engine rotation speed $N_E$. The continuously variable transmission control portion 72 calculates the torque ratio t from, for example, a relationship not depicted (an operation characteristic diagram of the torque converter) empirically obtained and stored in advance between a speed ratio e of the torque converter 14 (=a turbine rotation speed $N_T$/a pump rotation speed $N_P$) and the torque ratio t, based on an actual speed ratio e.

The vehicle 10 of this example does not include an input shaft rotation speed sensor for detecting the input shaft rotation speed $N_{IN}$ that is the rotation speed of the input shaft 32 defined as an input rotation speed of the continuously variable transmission 18. Therefore, when calculating an actual gear ratio γ (=$N_{IN}$/$N_{OUT}$) of the continuously variable transmission 18, the continuously variable transmission control portion 72 uses as the input shaft rotation speed $N_{IN}$, for example, a value based on the turbine rotation speed $N_T$ defined as a detection value of a rotation speed on an input side of the forward/reverse switching device 16. For example, if the shift lever 36 is at the D-position, the turbine rotation speed $N_T$ is directly used as the input shaft rotation speed $N_{IN}$.

The continuously variable transmission control portion 72 calculates a target secondary thrust force Wout* (=Pout*×a pressure receiving area of 44b) based on the target secondary pressure Pout*. The continuously variable transmission control portion 72 calculates a thrust force ratio τ based on the target gear ratio γ* from a relationship not depicted (a thrust force ratio map) obtained and stored in advance between the target gear ratio γ* and the thrust force ratio τ (=Wout/Win) for realizing the target gear ratio γ*. The continuously variable transmission control portion 72 calculates a target primary thrust force Win* (Win*/τ) based on the calculated thrust force ratio τ and the target secondary thrust force Wout*. The continuously variable transmission control portion 72 calculates the target primary pressure Pin* (=Win*/a pressure receiving area of 40b) based on the target primary thrust force Win*.

The continuously variable transmission control portion 72 uses, for example, feedforward control (FF control) to determine the primary instruction oil pressure Pintgt at which the target primary pressure Pin* is acquired, and the secondary instruction oil pressure Pouttgt at which the target secondary pressure Pout* is acquired, and outputs the primary instruction oil pressure Pintgt and the secondary instruction oil pressure Pouttgt as the hydraulic control command signal $S_{CVT}$ to the hydraulic control circuit 100. The hydraulic control circuit 100 actuates the linear solenoid valve SLP to adjust the primary pressure Pin and actuates the linear solenoid valve SLS to adjust the secondary pressure Pout in accordance with the hydraulic control command signal $S_{CVT}$.

For example, to make a compensation for oil pressure variation (variation on hydraulic control) on the primary pulley 40 side, the continuously variable transmission control portion 72 corrects the primary instruction oil pressure Pintgt through feedback control (FB control) based on a gear ratio deviation Δγ (=γ*−γ) between the target gear ratio γ* and the actual gear ratio γ such that the actual gear ratio γ becomes identical to the target gear ratio γ*. For example, to make a compensation for oil pressure variation on the secondary pulley 44 side, the continuously variable transmission control portion 72 corrects the secondary instruction oil pressure Pouttgt through FB control based on an oil pressure deviation ΔPout (=Pout*−a Pout detection value) between a detection value of the secondary pressure Pout and the target secondary pressure Pout* such that a detection value of the secondary pressure Pout from the secondary pressure sensor 62 becomes identical to the target secondary pressure Pout*.

When the shift lever 36 is operated to the N-position, the forward/reverse switching device 16 is put into the power transmission interrupted state and, therefore, the shift control of the continuously variable transmission 18 cannot be provided by using a value based on the turbine rotation speed $N_T$ as the input shaft rotation speed $N_{IN}$. Thus, if the shift lever 36 is operated to the N-position during vehicle running, the continuously variable transmission control portion 72 provides the shift control of the continuously variable transmission 18 only through the FF control instead of the shift control of the continuously variable transmission 18 through the FF control and the FB control. During vehicle deceleration running (e.g., during coasting with an accelerator turned off), the control must be provided for returning the gear ratio γ of the continuously variable transmission 18 to the maximum gear ratio γmax in preparation for the next vehicle start. However, if the shift control of the continuously variable transmission 18 cannot be provided through the FB control because the shift lever 36 is operated to the N-position during vehicle deceleration running, an effect of individual variation etc. of the continuously variable transmission 18 cannot be canceled and, therefore, the gear ratio γ of the continuously variable transmission 18 may not completely be returned to the maximum gear ratio γmax before a vehicle stop. As a result, since the gear ratio γ of the continuously variable transmission 18 is not completely returned to the maximum gear ratio γmax at the time of the vehicle stop, vehicle starting performance may deteriorate.

Therefore, when the forward/reverse switching device 16 is in the power transmission interrupted state during vehicle deceleration running, the electronic control device 50 of this example provides the shift control at the time of clutch release, which facilitates a change of the gear ratio γ of the continuously variable transmission 18 to a lower vehicle speed side (i.e., which changes the gear ratio γ of the continuously variable transmission 18 earlier to the lower vehicle speed side) as compared to when the forward/reverse switching device 16 is in the power transmittable state. For example, when the forward/reverse switching device 16 is in the power transmission interrupted state, the electronic control device 50 sets a larger change amount of a control object (i.e., a control amount) for varying the gear ratio γ of the continuously variable transmission 18 toward the lower vehicle speed side as compared to when the forward/reverse switching device 16 is in the power transmittable state, thereby changing the gear ratio of the continuously variable transmission 18 earlier to the lower vehicle speed side. Specifically, as indicated by a broken line of FIG. 6, when the forward/reverse switching device 16 is in the power transmission interrupted state, the electronic control device 50 sets a larger change amount of the target gear ratio γ* defined as the control object directed to the maximum gear ratio γmax as compared to the normal time when the forward/reverse switching device 16 is in the power transmittable state (see, e.g., a solid line of FIG. 6), thereby changing the gear ratio γ of the continuously variable transmission 18 earlier to the lower vehicle speed side. Consequently, as indicated by the broken line of FIG. 6, a timing of the target gear ratio γ* reaching the maximum gear ratio γmax is made earlier as compared to the normal time. The change amount of the target gear ratio γ* directed to the maximum gear ratio γmax corresponds to the control amount and is a function of the target gear ratio γ*. In repeatedly provided control (e.g., a flowchart depicted in FIG. 9 described later), the change amount corresponds to a change speed. The shift control of the continuously variable transmission 18 through the FF control and the FB control is shift control at the normal time. Even when the shift control of the continuously variable transmission 18 is provided only through the FF control, the shift control without an earlier change of the gear ratio γ of the continuously variable transmission 18 to the lower vehicle speed side is the shift control at the normal time only through the FF control.

If the target gear ratio γ* achieved with the shift lever 36 at the N-position during vehicle deceleration running is made larger than the target gear ratio γ* achieved with the shift lever 36 at the D-position, the shift operation of the shift lever 36 from N to D may increase the vehicle deceleration G because the engine rotation speed $N_E$ is picked up in the course of engagement of the forward clutch C1 in the forward/reverse switching device 16, or may increase an engine brake after the engagement of the forward clutch C1, thereby deteriorating the drivability. Therefore, properly ensuring the vehicle starting performance may not be satisfied at the same time with improvement in the drivability.

Figure 6:
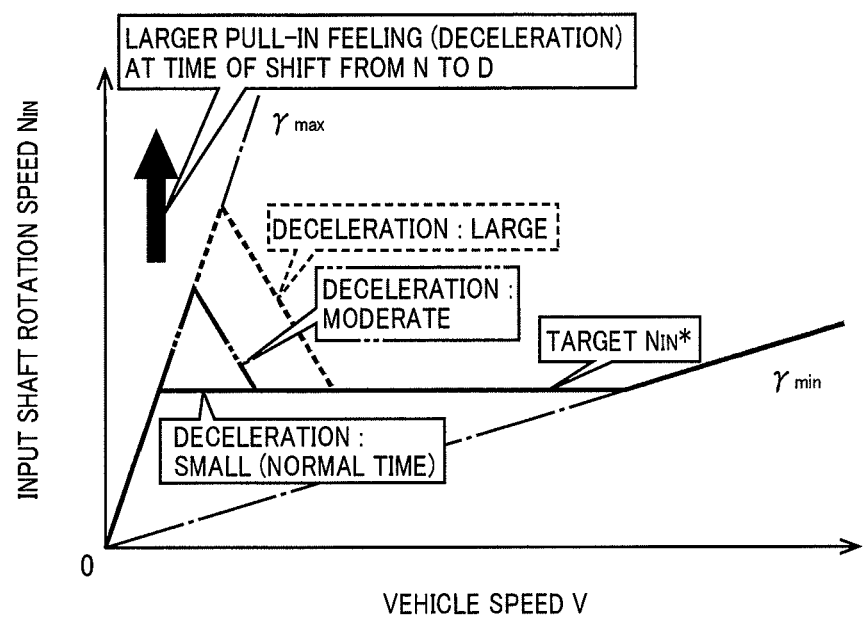
FIG. 6 is a diagram depicting an example of a target gear ratio set when a forward/reverse switching device is in a power transmission interrupted state.
Figure 7:
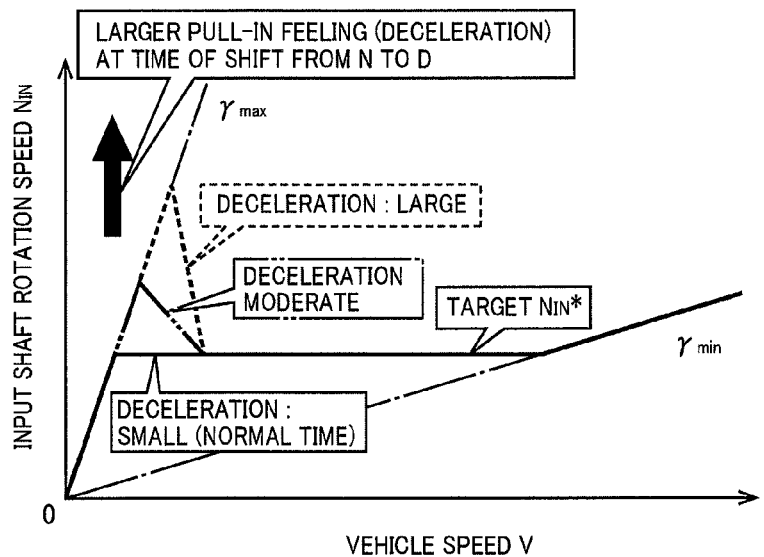
FIG. 7 is a diagram depicting an example of a target gear ratio set when a forward/reverse switching device is in a power transmission interrupted state and is different example from FIG. 6.
Figure 8:
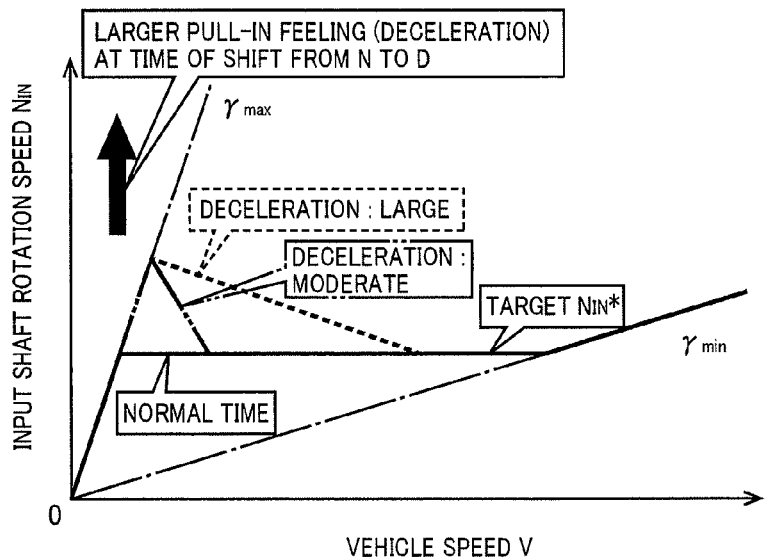
FIG. 8 is a diagram depicting an example of a target gear ratio set when a forward/reverse switching device is in a power transmission interrupted state and is different example from FIG. 6.

Therefore, when the forward/reverse switching device 16 is in the power transmission interrupted state, the electronic control device 50 of this example changes the gear ratio γ of the continuously variable transmission 18 earlier to the lower vehicle speed side when the vehicle deceleration G is larger. Specifically, as depicted in FIG. 6, when the vehicle deceleration G is moderate (see a dashed-two dotted line) and when the vehicle deceleration G is large (see the broken line), the electronic control device 50 sets a larger change speed of the target gear ratio γ* directed to the maximum gear ratio γmax as compared to when the vehicle deceleration G is small (see a solid line), thereby changing the gear ratio γ of the continuously variable transmission 18 earlier to the lower vehicle speed side. Alternatively, as indicated by the dashed-two dotted line and the broken line of FIG. 6, for example, if the change speed of the target gear ratio γ* directed to the maximum gear ratio γmax is at the same level, when the vehicle deceleration G is larger, the electronic control device 50 makes switching timing earlier for switching the shift control at the normal time (see the solid line) in which the gear ratio γ (e.g., the target gear ratio γ*) of the continuously variable transmission 18 is directed to the lower vehicle speed side (e.g., the maximum gear ratio γmax) at a predetermined change speed defined and stored in advance as a value used for the shift control at the normal time, to the shift control at the time of clutch release in which the gear ratio γ is directed to the lower vehicle speed side at a change speed faster than the predetermined change speed, thereby changing the gear ratio γ of the continuously variable transmission 18 earlier to the lower speed side. Alternatively, as depicted in FIG. 7, when the vehicle deceleration G is larger, the electronic control device 50 sets a larger change speed of the target gear ratio γ* directed to the maximum gear ratio γmax, thereby changing the gear ratio γ of the continuously variable transmission 18 earlier to the lower speed side. In the example of FIG. 7, although the switching timing is equivalent regardless of the vehicle deceleration G, the timing of the target gear ratio γ* reaching the maximum gear ratio γmax is consequently made earlier when the vehicle deceleration G becomes larger. Alternatively, as depicted in FIG. 8, for example, when the vehicle deceleration G becomes larger, the electronic control device 50 makes the switching timing earlier, thereby changing the gear ratio γ of the continuously variable transmission 18 earlier to the lower speed side. In the example of FIG. 8, although a change speed of the target gear ratio γ* directed to the maximum gear ratio γmax is not set larger when the vehicle deceleration G becomes larger, the timing of the target gear ratio γ* reaching the maximum gear ratio γmax is consequently made earlier when the forward/reverse switching device 16 is in the power transmission interrupted state as compared to the normal time, and is made equivalent regardless of the vehicle deceleration G.

More specifically, returning to FIG. 3, a vehicle information acquiring means, i.e., a vehicle information acquiring portion 74 acquires the accelerator opening degree $A_{CC}$, the vehicle deceleration the vehicle speed V, the shift positions $P_{SH}$, etc., based on the various input signals detected by the sensors, for example.

A transmission path connection/disconnection determining means, i.e., a transmission path connection/disconnection determining portion 76 determines, for example, whether the forward/reverse switching device 16 is in the power transmission interrupted state during vehicle deceleration running, based on whether the accelerator is turned off with the shift positions $P_{SH}$ set to the N-position. In other words, the transmission path connection/disconnection determining portion 76 determines whether both the forward clutch C1 and the reverse brake B1 are released in the forward/reverse switching device 16 during vehicle deceleration running. For example, if the transmission path connection/disconnection determining portion 76 determines that the forward/reverse switching device 16 is not in the power transmission interrupted state, the continuously variable transmission control portion 72 provides the shift control at the normal time of the continuously variable transmission 18 through the FF control and the FB control.

For example, if the transmission path connection/disconnection determining portion 76 determines that the forward/reverse switching device 16 is in the power transmission interrupted state during vehicle deceleration running, a switching timing calculating means, i.e., a switching timing calculating portion 78 calculates the switching timing for switching the shift control at the normal time to the shift control at the time of clutch release based on the vehicle deceleration G. For example, the switching timing calculating portion 78 calculates a determination vehicle speed V' based on the actual vehicle deceleration G from a relationship (switching timing map) obtained and stored in advance such that the determination vehicle speed V' defined as the switching timing is set on a higher vehicle speed side when the vehicle deceleration G is larger.

A switching timing attainment determining means, i.e., a switching timing attainment determining portion 80 determines, for example, whether the actual vehicle speed V is equal to or less than the determination vehicle speed V' calculated by the switching timing calculating portion 78. For example, if the switching timing attainment determining portion 80 determines that the actual vehicle speed V is higher than the determination vehicle speed V', the continuously variable transmission control portion 72 provides the shift control at the normal time of the continuously variable transmission 18 only through the FF control.

For example, if the switching timing attainment determining portion 80 determines that the actual vehicle speed V is equal to or less than the determination vehicle speed V', a control amount determining means, i.e., a control amount determining portion 82 determines a control amount based on the actual vehicle speed V and the vehicle deceleration G from a relationship (control amount map) obtained and stored in advance for the vehicle speed V/the vehicle deceleration G and the control amount (e.g., a change speed of the target gear ratio γ* directed to the maximum gear ratio γmax).

The control amount map is obtained and stored in advance based on the viewpoint described below. For example, when the vehicle deceleration G is relatively larger, if the shift control at the time of clutch release can be provided from a relatively high state of the actual vehicle speed V (e.g., if it is determined that the actual vehicle speed V is equal to or less than the determination vehicle speed V' because the actual vehicle speed V reaches the determination vehicle speed V'), the change speed of the target gear ratio γ* directed to the maximum gear ratio γmax can be made relatively smaller even when the vehicle deceleration G is relatively larger (see FIG. 8). On the other hand, for example, even when the vehicle deceleration G is relatively larger, if the shift control at the time of clutch release can only be provided from a relatively low state of the vehicle speed V due to the relatively lower vehicle speed V at the time of shift operation from N to D (e.g., if it is determined that the actual vehicle speed V is equal to or less than the determination vehicle speed V' because the actual vehicle speed V is already lower than the determination vehicle speed V'), the change speed of the target gear ratio γ* directed to the maximum gear ratio γmax must be set larger when the vehicle deceleration G is larger (see FIG. 7).

For example, if the switching timing attainment determining portion 80 determines that the actual vehicle speed V is lower than the determination vehicle speed V', the continuously variable transmission control portion 72 provides the shift control at the time of clutch release only through the FF control in accordance with the control amount determined by the control amount determining portion 82.

Figure 9:
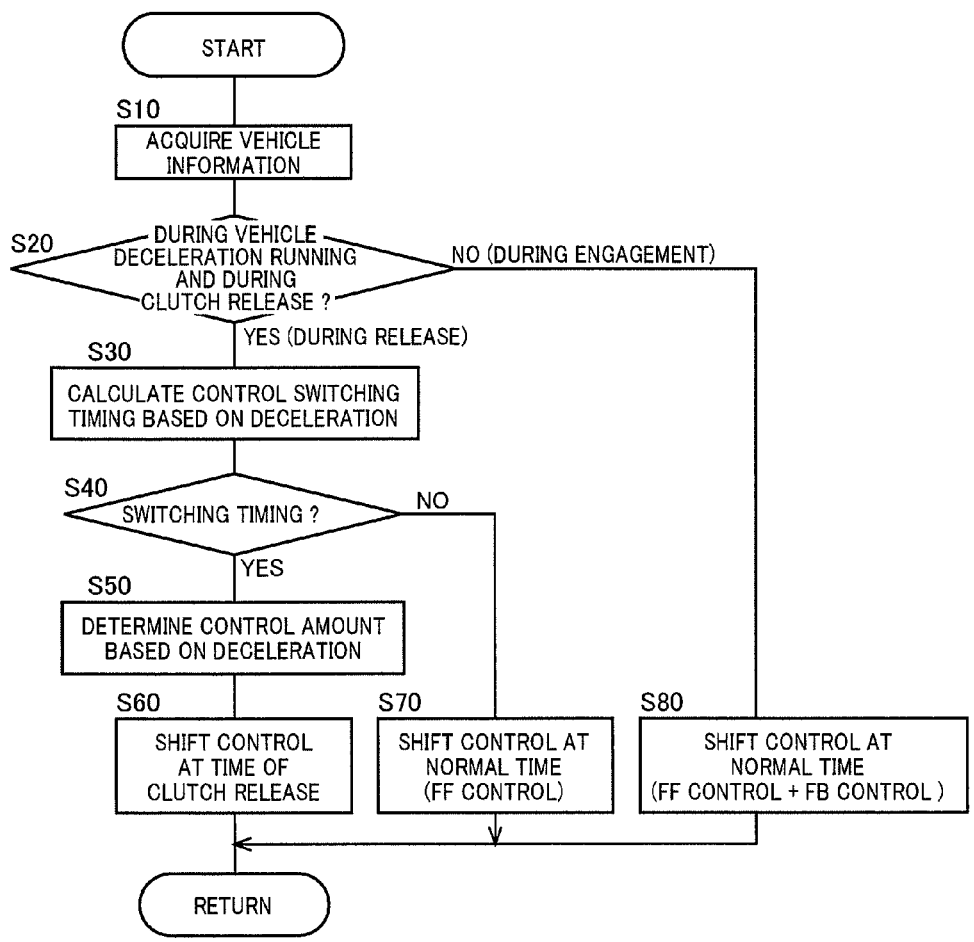
FIG. 9 is a flowchart for explaining a main portion of the control operation of the electronic control device, i.e., the control operation for properly changing the gear ratio to the lower vehicle speed side during vehicle deceleration to properly ensure the starting performance at the next vehicle start.

FIG. 9 is a flowchart for explaining a main portion of the control operation of the electronic control device 50, i.e., the control operation for properly changing the gear ratio γ to the lower vehicle speed side during vehicle deceleration to properly ensure the starting performance at the next vehicle start, and is repeatedly executed with an extremely short cycle time, for example, on the order of a few msec to a few tens of msec.

In FIG. 9, first, at step S10 (hereinafter, step will be omitted) corresponding to the vehicle information acquiring portion 74, the accelerator opening degree $A_{CC}$, the vehicle deceleration G, the vehicle speed V, the shift positions $P_{SH}$, etc. are acquired based on the various input signals detected by the sensors, for example. At S20 corresponding to the transmission path connection/disconnection determining portion 76, it is determined whether both the forward clutch C1 and the reverse brake B1 are released during vehicle deceleration running, for example. If the determination of S20 is affirmative, the determination vehicle speed V' is calculated at S30 corresponding to the switching timing calculating portion 78 as the switching timing for switching the shift control at the normal time to the shift control at the time of clutch release based on the vehicle deceleration G, for example. At S40 corresponding to the switching timing attainment determining portion 80, it is determined whether the actual vehicle speed V is equal to or less than the determination vehicle speed V' calculated at S30, for example. If the determination of S40 is affirmative, at S50 corresponding to the control amount determining portion 82, the change speed of the target gear ratio γ* directed to the maximum gear ratio γmax is determined based on the vehicle deceleration G etc., for example. At S60 corresponding to the continuously variable transmission control portion 72, the shift control at the time of clutch release is provided only through the FF control to direct the target gear ratio γ* to the maximum gear ratio γmax at the change speed determined at S50, for example. On the other hand, if the determination at S40 is negative, at S70 corresponding to the continuously variable transmission control portion 72, the shift control at the normal time of the continuously variable transmission 18 is provided only through the FF control to direct the target gear ratio γ* to the maximum gear ratio γmax at a predetermined change speed, for example. On the other hand, if the determination at S20 is negative, at S80 corresponding to the continuously variable transmission control portion 72, the shift control at the normal time of the continuously variable transmission 18 is provided through the FF control and the FB control to direct the target gear ratio γ* to the maximum gear ratio γmax at a predetermined change speed, for example.

As described above, according to this example, when the forward/reverse switching device 16 is in the power transmission interrupted state during vehicle deceleration running, the gear ratio γ of the continuously variable transmission 18 is changed earlier to the lower vehicle speed side as compared to when the forward/reverse switching device 16 is in the power transmittable state and, therefore, the gear ratio γ can properly be changed to the lower vehicle speed side during vehicle deceleration regardless of individual variation etc., even in the shift control of the continuously variable transmission 18 only through the FF control. Thus, the gear ratio γ is more easily returned to the maximum gear ratio γmax before a vehicle stop, and the starting performance can properly be ensured at the next vehicle stop.

According to this example, when the forward/reverse switching device 16 is in the power transmission interrupted state, the gear ratio γ of the continuously variable transmission 18 is changed earlier to the lower vehicle speed side if the vehicle deceleration G is larger and, therefore, an increase in the vehicle deceleration G can be suppressed when the forward/reverse switching device 16 is changed from the power transmission interrupted state to the power transmittable state during vehicle deceleration. While a vehicle stop is reached earlier when the vehicle deceleration G is larger, the gear ratio γ of the continuously variable transmission 18 is more easily returned to the maximum gear ratio γmax before the vehicle stop.

According to this example, since a control amount for changing the gear ratio γ of the continuously variable transmission 18 toward the lower vehicle speed side is set larger so as to change the gear ratio γ earlier to the lower vehicle speed side, the gear ratio γ can certainly be changed earlier to the lower vehicle speed side when the forward/reverse switching device 16 is in the power transmission interrupted state as compared to the power transmittable state. Alternatively, when the forward/reverse switching device 16 is in the power transmission interrupted state, the gear ratio γ can certainly be changed earlier to the lower vehicle speed side if the vehicle deceleration G is larger.

According to this example, switching timing is made earlier for switching the shift control at the normal time in which the gear ratio γ of the continuously variable transmission 18 is directed to the lower vehicle speed side at a predetermined change speed to the shift control at the time of clutch release in which the gear ratio γ is directed to the lower vehicle speed side at a change speed faster than the predetermined change speed, so as to change the gear ratio γ of the continuously variable transmission 18 earlier to the lower vehicle speed side when the vehicle deceleration G is larger and, therefore, when the forward/reverse switching device 16 is in the power transmission interrupted state, the gear ratio γ can certainly be changed earlier to the lower vehicle speed side if the vehicle deceleration G is larger.

According to this example, since the control amount is a change amount (change speed) of the target gear ratio γ* to be followed by an actual value of the gear ratio γ of the continuously variable transmission 18, the control amount (i.e., the change speed of the target gear ratio γ* directed to the maximum gear ratio γmax) can easily be made larger.

According to this example, since the shift control of the continuously variable transmission 18 is provided by using as the input shaft rotation speed $N_{IN}$ a value based on the turbine rotation speed $N_T$ defined as a detection value of the rotation speed on the input side of the forward/reverse switching device 16, the input rotation speed sensor for detecting the input shaft rotation speed $N_{IN}$ can be eliminated to achieve reduction in cost. For the vehicle 10 providing the shift control of the continuously variable transmission 18 with a detection value of the rotation speed on the input side of the forward/reverse switching device 16 with the input rotation speed sensor eliminated, this example is a particularly useful invention for solving a problem occurring in the vehicle 10.

Although the example of the present invention has been described in detail with reference to the drawings, the present invention is applicable in other forms.

For example, although the control amount for changing the gear ratio γ of the continuously variable transmission 18 toward the lower vehicle speed side is the change amount (change speed) of the target gear ratio γ* in the example, this is not a limitation. The continuously variable transmission 18 has the primary thrust force Win and the secondary thrust force Wout respectively controlled for performing a shift (i.e., to set the actual gear ratio γ to the target gear ratio γ* while a slip of the transmission belt 46 is prevented). The target gear ratio γ* is realized through the correlation (e.g., the thrust force ratio τ) between the primary thrust force Win and the secondary thrust force Wout. Therefore, the control amount may be a change amount of the thrust force ratio τ defined as a control object based on the primary thrust force Win and the secondary thrust force Wout for realizing the target gear ratio γ*. The control amount may be a change amount of an oil pressure command value (the primary instruction oil pressure Pintgt and the secondary instruction oil pressure Pouttgt) defined as a control object for acquiring the primary thrust force Win and the secondary thrust force Wout respectively. The same effect as the example is also acquired in these ways.

Although the present invention has been described by exemplarily illustrating the vehicle 10 without the input rotation speed sensor for detecting the input shaft rotation speed $N_{IN}$ of the continuously variable transmission 18 in the example, the present invention is applicable even to a vehicle including the input rotation speed sensor. For example, the present invention is particularly useful for substituting the turbine rotation speed sensor 54 for the input rotation speed sensor when the input rotation speed sensor fails, for example.

Although the torque converter 14 having the lockup clutch 26 is used as the fluid transmission device in the example, the lockup clutch 26 may not necessarily be included and another fluid transmission device such as a fluid coupling without a torque amplification effect may be used instead of the torque converter 14. If a forward/reverse switching device 16 acts as a starting mechanism, if a starting mechanism such as a starting clutch is included, or if an engagement device etc. are included that can connect/disconnect a power transmission path, a fluid transmission device may not be included. If the forward/reverse switching device 16 is disposed on a subsequent stage of (closer to the drive wheels 24 than) the continuously variable transmission 18 and a starting clutch is included instead of the torque converter 14, the starting clutch acts as the transmission path connecting/disconnecting device of the present invention. In such a case, a value based on the engine rotation speed $N_E$ defined as a detection value of the rotation speed on an input side of the starting clutch is used as the input shaft rotation speed $N_{IN}$.

Although each of FIGS. 6, 7, and 8 depicts an example of the target gear ratio γ* set when the forward/reverse switching device 16 is in the power transmission interrupted state in the example, examples of the FIGS. 6, 7, and 8 may be used independently of, or in combination with, each other.

Although the hydraulic control circuit 100 of the example is configured to directly control an oil pressure supplied to the primary-side hydraulic cylinder 40c to acquire the primary pressure Pin, this is not a limitation. For example, the present invention may be applicable to a hydraulic control circuit configured such that a flow rate of the operating oil to the primary-side hydraulic cylinder 40c is controlled to consequently generate the primary pressure Pin.

Although the hydraulic control circuit 100 of the example has the secondary pressure sensor 62 disposed for the secondary pulley 44 to control the gear ratio γ of the continuously variable transmission 18 on the primary pulley 40 side while controlling the belt clamping pressure of the continuously variable transmission 18 on the secondary pulley 44 side, this is not a limitation. For example, the present invention may be applicable to a hydraulic control circuit configured to have a hydraulic sensor for the primary pulley 40 to control the gear ratio γ of the continuously variable transmission 18 on the secondary pulley 44 side while controlling the belt clamping pressure of the continuously variable transmission 18 on the primary pulley 40 side. Although the hydraulic control circuit is configured to prevent a slip of the transmission belt 46 with the primary pressure Pin (having the same meaning as the primary thrust force Win) and the secondary pressure Pout (having the same meaning as the secondary thrust force Wout) and realize the target gear ratio γ* through the correlation between the primary thrust force Win and the secondary thrust force Wout, this is not a limitation. For example, a hydraulic control circuit may be configured such that a target shift is realized on one pulley side while a target belt clamping pressure is realized on the other pulley side.

Although the shift control of the continuously variable transmission 18 through the FB control is provided based on the gear ratio deviation Δγ (=γ*−γ) in the example, the gear ratio deviation Δγ is used merely as an example of a deviation. In short, this deviation may be a deviation between a target value and an actual value of a parameter corresponding one-to-one to the gear ratio γ. For example, the gear ratio deviation Δγ can be replaced with a rotation deviation $\Delta N_{IN}$ (=$N_{IN}$*−$N_{IN}$) between the target input shaft rotation speed $N_{IN}$* and the actual input shaft rotation speed $N_{IN}$, a deviation ΔX (=X*−X) between a target pulley position X* and an actual pulley position X, a deviation ΔR (=R*−R) between a target belt wrapping diameter R* and an actual belt wrapping diameter R, etc.

The above description is merely an embodiment and the present invention may be implemented in variously modified and improved forms based on the knowledge of those skilled in the art.

NOMENCLATURE OF ELEMENTS

12: engine (drive force source) 16: forward/reverse switching device (transmission path connecting/disconnecting device) 18: belt type continuously variable transmission (continuously variable transmission for a vehicle) 40: input-side variable pulley 44: output-side variable pulley 46: transmission belt 50: electronic control device (control device)

The invention claimed is:

1. A control device for controlling a continuously variable transmission of a vehicle, the vehicle including a drive force source and a transmission path connecting/disconnecting device which is to be placed in a power transmittable state for enabling transmission of a power of the drive force source to the continuously variable transmission through a transmission path between the drive force source and the continuously variable transmission, and which is to be placed in a power transmission interrupted state for interrupting the transmission of the power of the drive force source to the continuously variable transmission through the transmission path, the control device being configured, during deceleration of the vehicle, to increase a gear ratio of the continuously variable transmission, such that the gear ratio is increased earlier when the transmission path connecting/disconnecting device is in the power transmission interrupted state, than when the transmission path connecting/disconnecting device is in the power transmittable state, and such that the gear ratio is increased earlier when a degree of the deceleration is large, than when the degree of the deceleration is small, during the deceleration with the transmission path connecting/disconnecting device being in the power transmission interrupted state.

2. The control device of claim 1, being configured, during the deceleration of the vehicle, to increase a control amount for increasing the gear ratio of the continuously variable transmission when the transmission path connecting/disconnecting device is in the power transmission interrupted state, such that the gear ratio is increased earlier when the transmission path connecting/disconnecting device is in the power transmission interrupted state, than when the transmission path connecting/disconnecting device is in the power transmittable state.

3. The control device of claim 2, wherein the control amount is a change amount of a target value of the gear ratio which is to be followed by an actual value of the gear ratio of the continuously variable transmission.

4. The control device of claim 2, wherein
the continuously variable transmission includes a pair of variable pulleys having an input-side variable pulley and an output-side variable pulley, and a transmission belt wrapped around between the pair of the variable pulleys, wherein
the control device is configured to control each of an input-side thrust force in the input-side variable pulley and an output-side thrust force in the output-side variable pulley to change the gear ratio of the continuously variable transmission, and wherein
the control amount is a change amount of a thrust force ratio based on the input-side thrust force and the output-side thrust force or a change amount of an oil pressure command value for acquiring each of the input-side thrust force and the output-side thrust force.

5. The control device of claim 1, being configured, during the deceleration of the vehicle, to execute a normal rate control for increasing the gear ratio at a normal increase rate and to execute a high rate control for increasing the gear ratio at a high increase rate that is higher than the normal increase rate, such that the high rate control is executed after the normal rate control is executed, the control device being configured to earlier switch from execution of the normal rate control to execution of the high rate control when the degree of the deceleration is large, than when the degree of the deceleration is small.

6. The control device of claim 1, being configured to obtain an actual value of the near ratio of the continuously variable transmission, based on a detection value of a rotation speed on an input side of the transmission path connecting/disconnecting device that is used as a rotation speed of an input side of the continuously variable transmission.

7. The control device of claim 1, being configured, when the transmission path connecting/disconnecting device is in the power transmittable state, to increase the gear ratio to a first value as a running speed of the vehicle is reduced to a given value during the deceleration of the vehicle, the control device being configured, when the transmission path connecting/disconnecting device is in the power transmission interrupted state, to increase the gear ratio to a second value larger than said first value as the running speed is reduced to said given value during a first degree of the deceleration of the vehicle, and the control device being configured, when the transmission path connecting/disconnecting device is in the power transmission interrupted state, to increase the gear ratio to a third value larger than said second value as the running speed is reduced to said given value during a second degree of the deceleration of the vehicle, the second degree being higher than said first degree.

* * * * *